US011844024B2

(12) United States Patent
Yu et al.

(10) Patent No.: US 11,844,024 B2
(45) Date of Patent: Dec. 12, 2023

(54) TECHNIQUES OF USER EQUIPMENT RECEIVER POWER SWITCHING

(71) Applicant: Intel Corporation, Santa Clara, CA (US)

(72) Inventors: Zhibin Yu, Unterhaching (DE); Bertram Gunzelmann, Koenigsbrunn (DE); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/057,111

(22) PCT Filed: Jan. 7, 2019

(86) PCT No.: PCT/EP2019/050249
§ 371 (c)(1),
(2) Date: Nov. 20, 2020

(87) PCT Pub. No.: WO2020/143901
PCT Pub. Date: Jul. 16, 2020

(65) Prior Publication Data
US 2021/0329561 A1    Oct. 21, 2021

(51) Int. Cl.
*H04W 52/02* (2009.01)
*H04W 76/28* (2018.01)

(52) U.S. Cl.
CPC ... *H04W 52/0274* (2013.01); *H04W 52/0216* (2013.01); *H04W 52/0229* (2013.01); *H04W 76/28* (2018.02)

(58) Field of Classification Search
CPC ........ H04W 52/0274; H04W 52/0216; H04W 52/0229; H04W 76/28; H04W 52/0235; H04W 56/00; Y02D 30/70

USPC ...................................................... 455/343.4
See application file for complete search history.

(56) References Cited

U.S. PATENT DOCUMENTS

| | | | |
|---|---|---|---|
| 2010/0009643 A1* | 1/2010 | Haartsen | H04W 52/0251 455/127.5 |
| 2018/0338281 A1* | 11/2018 | Bangolae | H04W 68/02 |
| 2019/0254110 A1* | 8/2019 | He | H04L 5/0048 |
| 2020/0092846 A1* | 3/2020 | Deng | H04W 68/025 |
| 2020/0404617 A1* | 12/2020 | Murray | H04B 7/0695 |

(Continued)

FOREIGN PATENT DOCUMENTS

WO    WO-2016182530 A1 * 11/2016    ........ H04W 52/0216

OTHER PUBLICATIONS

Itri, "On synchronized new carrier type", 3rd Generation Partnership Project, Jan./ Feb. 2013, 2 pages, TSG RAN WG 1 Meeting #72, St Julian's, Malta.

(Continued)

*Primary Examiner* — Shaima Q Aminzay
(74) *Attorney, Agent, or Firm* — VIERING,JENTSCHURA&PARTNERmbB

(57) ABSTRACT

Methods and devices including a processing circuit for a User Equipment, UE, wherein the UE includes a radio frequency, RF, receiver, wherein the processing circuit is configured to set a power switching pattern of the RF receiver for UE power saving in Discontinuous Reception, DRX, Radio Resource Control, RRC, IDLE mode based on a paging occasion, PO, and a signal block associated with the PO.

20 Claims, 12 Drawing Sheets

(56) References Cited

U.S. PATENT DOCUMENTS

2021/0274465 A1* 9/2021 Huang ................. H04J 11/0076
2021/0360532 A1* 11/2021 Jiang ................. H04W 52/0229

OTHER PUBLICATIONS

International Search Report issued for the PCT application No. PCT/EP2019/050249, dated Jul. 23, 2019, 10 pages (for informational purpose only).
Intel Corporation, "Further discussion on requirements in NR RRC_Idle", 3rd Generation Partnership Project, Aug. 2018, 6 pages, 3GPP TSG-RAN WG4 Meeting #88, Gothenburg, Sweden.

\* cited by examiner

TECHNIQUES OF USER EQUIPMENT RECEIVER POWER SWITCHING

CROSS-REFERENCE TO RELATED APPLICATIONS

This application is a national stage entry under 35 U.S.C. § 371 of PCT application No. PCT/EP2109/050249 filed on Jan. 7, 2019, the contents of which are incorporated by reference herein in their entirety.

FIELD

The disclosure relates to a User Equipment (UE) with a radio frequency (RF) receiver (RX) and techniques for setting a power switching of the RF receiver. The disclosure particularly relates to methods of adaptive RX Switching for New Radio (NR) Discontinuous Reception (DRX) on-duration overhead reduction and UE power saving, in particular for a 5G NR UE Implementation.

BACKGROUND

Discontinuous reception (DRX) is specified in both 3GPP 4G LTE and 5G NR standard for UE power saving in RRC_IDLE mode. In RRC_IDLE mode DRX operations, UE 110 periodically wakes up for a short duration (on-duration) to decode the downlink (DL) paging occasion (PO) 111 from the serving cell 120 as shown in FIG. 1. And then UE 110 enters back into sleep mode until the next on-duration is reached. The periodicity of POs is called DRX cycle length 112 which can be from 0.32 seconds up to 2.56 seconds.

In LTE, for PO reception in each DRX cycle, in order to overcome the gain/timing offset/frequency drifts after a long sleep time, UE needs turn on the RF receiver at least 1 sub-frame earlier ("warm-up sub-frame") before the allocated PO, and make use of the cell specific reference signals (CRS) within the warm-up sub-frame to estimate and compensate the AGC gain/timing drifts/frequency drifts in order to ensure the demodulation performance for the follow-up PO. In 5G NR, however, CRS is no longer available in the DL signals. Instead, a NR synchronization signal block (SSB), which is quasi co-located (QCLed) with the allocated PO and scheduled before a PO, is the working assumption to be used by UE for AGC/timing/frequency tracking "warm-up" for the follow-up PO reception. However, unlike LTE CRS which is available in every 1 ms, 5G NR SSB can have much longer periodicity (e.g. 5 ms/10 ms/20 ms/80 ms). As a result, the time-gap between a warm-up SSB and a follow-up PO can be much longer and this leads to very long on-duration time. The disclosure deals with the question how to improve the UE power saving behavior, in particular in 5G NR.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
5G NR: 3GPP fifth generation new radio specifications
UE: User Equipment
LTE: Long Term Evolution
IC: Integrated Circuit
RF: Radio Frequency
UL: uplink
DL: downlink
PDCCH: physical downlink control channel PDSCH: physical downlink shared channel
PO: paging occasion
DRX: discontinuous reception
AGC: analog gain control
SSB: synchronization signal block
QCL: quasi co-location
QCLed: quasi co-located
BW: bandwidth
PBCH: physical broadcast channel
DMRS: demodulation reference signal
PSS: primary synchronization signal
SSS: secondary synchronization signal
OFDM: orthogonal frequency division multiplex It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with radio cells such as access points, base stations, gNodeBs and/or eNodeBs. The described devices may include integrated circuits and/or passives and may be manufactured according to various technologies. For example, the circuits may be designed as logic integrated circuits, ASICs, analog integrated circuits, mixed signal integrated circuits, optical circuits, memory circuits and/or integrated passives.

Figure 1:
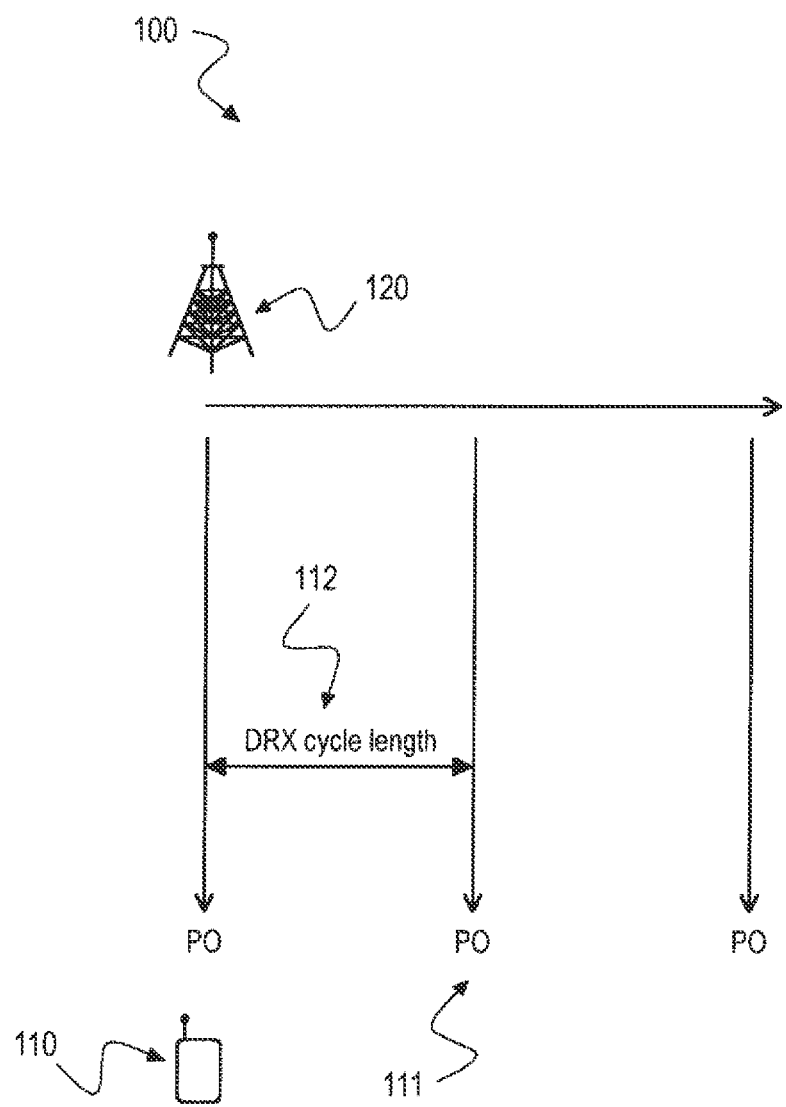
FIG. 1 is a schematic diagram of a communication system 100 with a base station 120 and a user equipment (UE) 110 illustrating paging occasions (POs) sent by the base station 120.

FIG. 1 is a schematic diagram illustrating a communication system 100 with a base station 120 (or serving cell 120) and a User Equipment (UE) 110. The UE 110 cyclically receives from the base station 120 paging occasions (POs) 111, i.e. signals that inform the UE 110 to listen if there is information from the base station 120 for the UE 110. If PO 111 indicates such information UE 110 will wake-up, otherwise UE 110 will stay in standby (i.e. power-down or power-save) mode.

As described above discontinuous reception (DRX) is specified in both 3GPP 4G LTE and 5G NR standard for UE power saving in RRC_IDLE mode. In RRC_IDLE mode DRX operations, UE 110 periodically wakes up for a short duration (on-duration) to decode the downlink (DL) paging occasion (PO) 111 from the serving cell 120. And then UE 110 enters back into sleep mode until the next on-duration is reached. The periodicity of POs 111 is called DRX cycle length 112 which can be from 0.32 seconds up to 2.56 seconds. Note that in IDLE mode, uplink (UL) transmissions are disabled in UE side (UE TX path is switched off). Thus, the UE modem power consumption is mainly contributed by the RF receiver (including external LNAs, band filters, etc.) for PO reception, and it is scaled with RX on-duration length in each DRX cycle.

In LTE, for PO reception in each DRX cycle, in order to overcome the gain/timing offset/frequency drifts after a long sleep time, UE 110 needs turn on the RF receiver at least 1 sub-frame earlier ("warm-up sub-frame") before the allocated PO, and make use of the cell specific reference signals (CRS) within the warm-up sub-frame to estimate and compensate the AGC gain/timing drifts/frequency drifts in order to ensure the demodulation performance for the follow-up PO 111.

In 5G NR, however, CRS is no longer available in the DL signals. Instead, a NR synchronization signal block (SSB), which is quasi co-located (QCLed) with the allocated PO and scheduled before a PO, is the working assumption to be used by UE for AGC/timing/frequency tracking "warm-up" for the follow-up PO reception. It implies that, the UE DRX on-duration needs to include both a PO 210 and a QCLed SSB 220 for "warm-up" as shown in FIG. 2.

Figure 2:
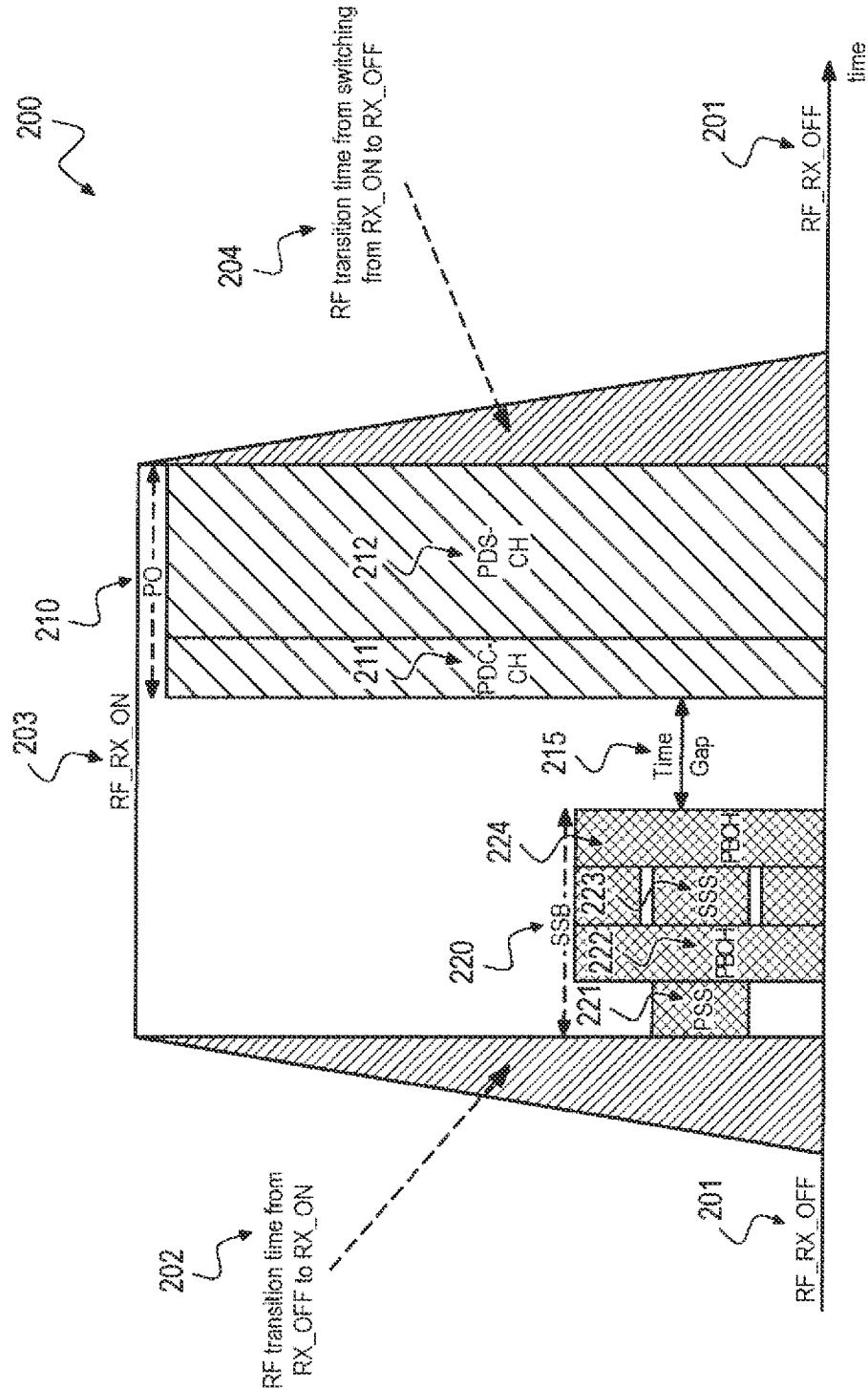
FIG. 2 is a schematic power diagram illustrating an exemplary on-duration UE RX switching for 5G NR IDLE DRX according to the disclosure.

FIG. 2 is a schematic power diagram illustrating an exemplary on-duration UE RX switching for 5G NR IDLE DRX according to the disclosure. FIG. 2 shows one example scheme for SSB 220 based warm-up for PO 210 reception, which is also the RAN1 (a standardization group in 5G NR) working assumption scheme for UE implementation.

However, unlike LTE CRS which is available in every 1 ms, 5G NR SSB 220 can have much longer periodicity (e.g. 5 ms/10 ms/20 ms/80 ms). Further, the gNB cannot always guarantee to schedule a PO 210 immediately after a quasi col-located (QCLed) SSB 220 to every UE, especially when there are massive number of UEs 110 served by a same gNB 120 (see FIG. 1) and they are receiving different paging messages (note that PO is UE specific and therefore has to be frequency/time multiplexed for massive number of UEs). As a result, the time-gap between a warm-up SSB 220 and a follow-up PO 210 can be much longer and this leads to very long on-duration time. Since IDLE mode UE modem power consumption is dominantly determined by the RX on-duration length per DRX, such long on-duration introduces significant negative impacts on the standby time of a smart phone. Further note that the allocated SSB 220 is not necessarily in the same central carrier frequency as a PO 210, and SSB 220 usually has much smaller bandwidth (BW) than a PO (PDCCH 211+PDSCH 212). Therefore, using the same RX bandwidth for receiving SSB 220 and PO 210 within a same on-duration is not power optimal.

As analyzed before, the working assumption approach in FIG. 2 introduces both time overhead (unnecessary RX on 203 during the gap time 215 between SSB 220 and PO 210) and bandwidth overhead (SSB 220 is received using the same sampling rate and RF filter BW as PO 210) for IDLE mode DRX on-duration in 5G NR. The disclosure introduces a new concept specifying a reduction of the SSB "warm-up" overheads for DRX on-duration (as much as possible), while still maintaining robust paging reception and demodulation performance. Note that DRX on-duration length is scaled with UE modem power consumption and is therefore critical for a smart phone stand-by time.

The concept described in this disclosure differs from previous solutions which do not use a QCLed SSB for DRX on-duration warm-up at all, but use the DMRS within the PO from the previous DRX cycle on-duration to track AGC/Timing offset/Frequency offset for on-duration in the next DRX cycle. However, as DRX cycle length may be higher than 320 ms and can be up to 2.56 seconds using DMRS in a previous paging occasion (PO) for parameter tracking can easily lead to UE losing the parameter tracking.

A first aspect described in this disclosure is based on adaptively allocating the RX switching pattern during NR IDLE DRX operations based on time-gap 215 length between the "warm-up" SSB 220 and the QCLed paging occasion (PO) 210 as shown in FIG. 2. The core idea is that, when the time-gap 215 is longer than RF switching transition time 202, the on-duration can be split into two dis-contiguous portions: one for warm-up SSB 220 reception and another for PO 210 reception. UE RX can be switched off during the time-gap 215 in between: this reduces the time overhead. Further, since the on-duration is split into two independent portions, the RF bandwidth and central carrier frequency can be adjusted for each portion, e.g. using narrow-band RF filter and low RF sampling rate for SSB 220 reception and WB (wide-band) RF filter and high RF sampling rate for PO 210 reception: this reduces the bandwidth overhead.

A second aspect described in this disclosure is based on further adapting the RX switching pattern by exploring the NR SSB structure, as well as run-time channel conditions, so as to minimize the DRX on-duration overhead while still maintain the robust paging reception. The core idea is to opportunistically skip a sub-set of heterogeneous reference symbols within the "warm-up" SSB 220, when the related channel KPIs (Key Performance Indicators) have higher error margins. For example, when timing drift is predicted to be low, the PBCH DMRS 224 within the ending symbol of SSB 220 is sufficient for time tracking, while leading symbols like PSS 221 and SSS 223 can be skipped, although PSS/SSS have better time drifting capture range than PBCH DMRS; For another example, when the "warm-up" SSB 220 is detected to be free from colliding SSB interferences from neighboring cells (e.g. can be achieved by SSS 223 blind detection from historical DRX cycles), PSS symbol 221 could be sufficient for serving AGC measurement and timing drift estimation, while other ending symbols (e.g. SSS 223 and PBCH DMRS 224) within a same SSB 220 can be skipped, although SSS/DMRS are better robust against interferences than PSS. Such trade-off can result in a minimum on-duration overhead. In particular, when time-gap 215 between a SSB 220 and the associated PO 210 is too short so that they cannot be split into dis-contiguous portions, skipping the ending symbols within the SSB 220 can relax such time-gap 215 and can make the split possible: This further results in bandwidth overhead reduction because RF BW and RF sampling rate can be adapted to different portions separately after the splitting. Examples are shown below with respect to FIGS. 6 and 7.

Thus, by using UE power switching according to the concept of the disclosure provides significant SSB warm-up overhead reduction for IDLE DRX on-durations, which leads to reduced UE power consumption in 5G NR IDLE mode and therefore can extend cell phone stand-by time. Meanwhile, UE modem still keeps robust DL paging reception, even though the DRX cycle length can be quite long.

Figure 3:
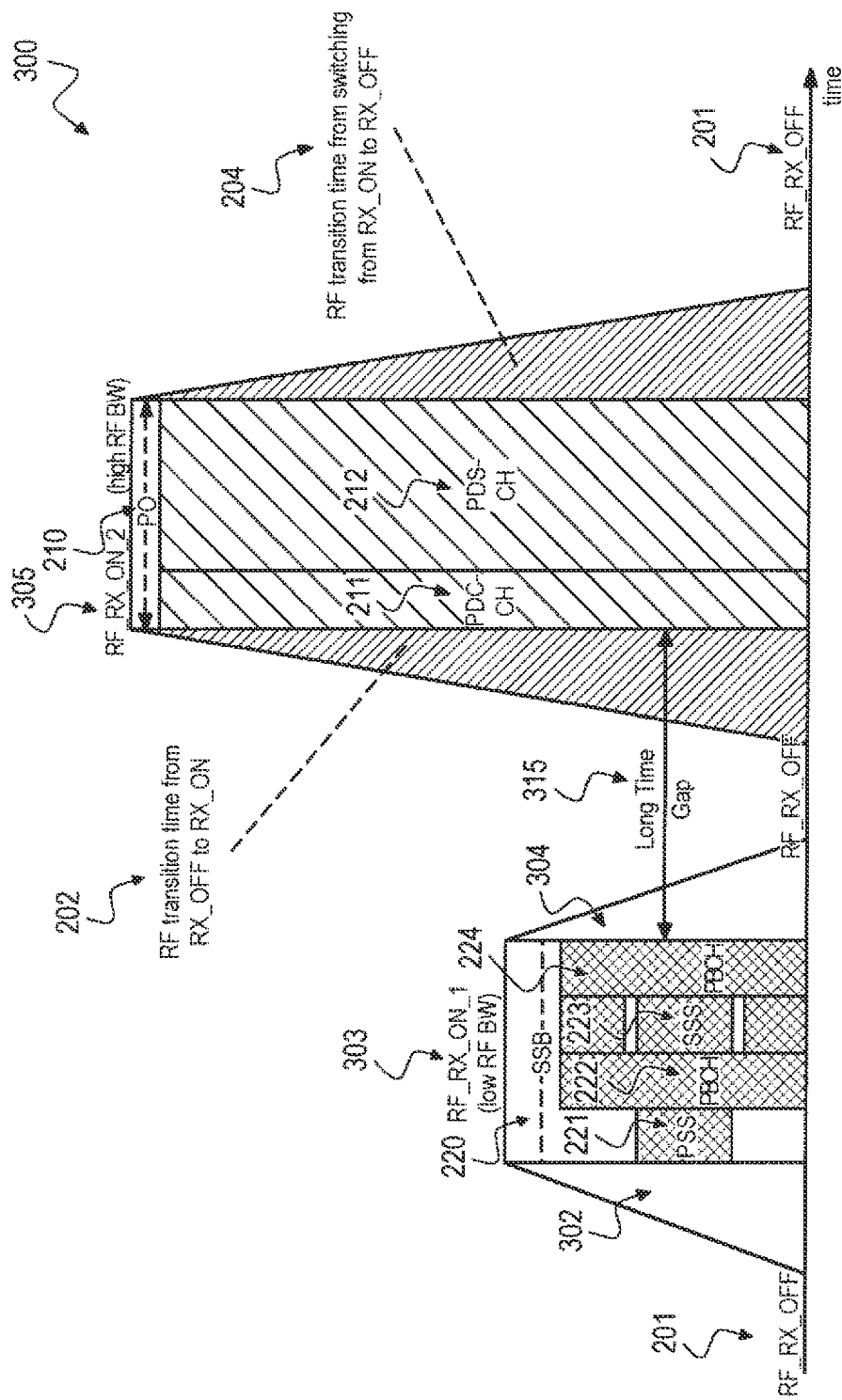
FIG. 3 is a schematic power diagram illustrating an example of SSB warm-up overhead reduction by opportunistic on-duration split and RX switching pattern adaption according to the disclosure.

FIG. 3 is a schematic power diagram illustrating an example of SSB warm-up overhead reduction by opportunistic on-duration split and RX switching pattern adaption according to the disclosure. FIG. 3 illustrates a first method (Method 1) according to the disclosure in which SSB warm-up overhead reduction is achieved by opportunistic on-duration separation and RF switching pattern adaption. FIG. 3 also shows a specific power switching pattern 300 for an RF receiver of a UE.

In this method, UE compares the time-gap length of the "warm-up" SSB 220 (i.e. the closest SSB 220 which is QCLed with PO 210) and the allocated PO 210, with a pre-defined threshold. Note that QCL information and SSB-PO time-gap length information can be derived by UE from RRC configurations in RRC_CONNECTED mode before entering into RRC_IDLE mode. The threshold can be the sum of the transition time 202 required by UE RF transceiver to switch from RX_OFF state 201 to RX_ON state 305, and the transition time 204 required by UE RF transceiver to switch from RX_ON state 305 to RX_OFF state 201. Note that, the RF transition time can be pre-measured in the Lab, and it is usually in the granularity of several OFDM symbol durations (depending on sub-carrier-spacing of the OFDM symbol). When the SSB-PO time-gap 315 is higher than the pre-defined time threshold, UE can separate the on-duration into two dis-contiguous portions: one for SSB 220 reception (from RF_RX_OFF 201 to RF_RX_ON_1 (low RF BW) 303 to RF_RX_OFF 201) and another for PO 210 reception (from RF_RX_OFF 201 to RF_RX_ON_2 (high RF BW) 305 to RF_RX_OFF 201) as shown in FIG. 3. Considering that SSB 220 has much narrower bandwidth than that of a PO 210 (containing PDCCH 211 and PDSCH 212), in a further implementation UE can allocate different RX bandwidths and sampling rate, as well as different RX central carrier frequencies within the RFIC (radio frequency integrated circuit) for SSB 220 reception portion and for PO 210 reception portion separately. These two optimizations can result in much shorter on-duration and optimized RF bandwidth/sampling rate setting than the scheme shown in FIG. 2.

Figure 4:
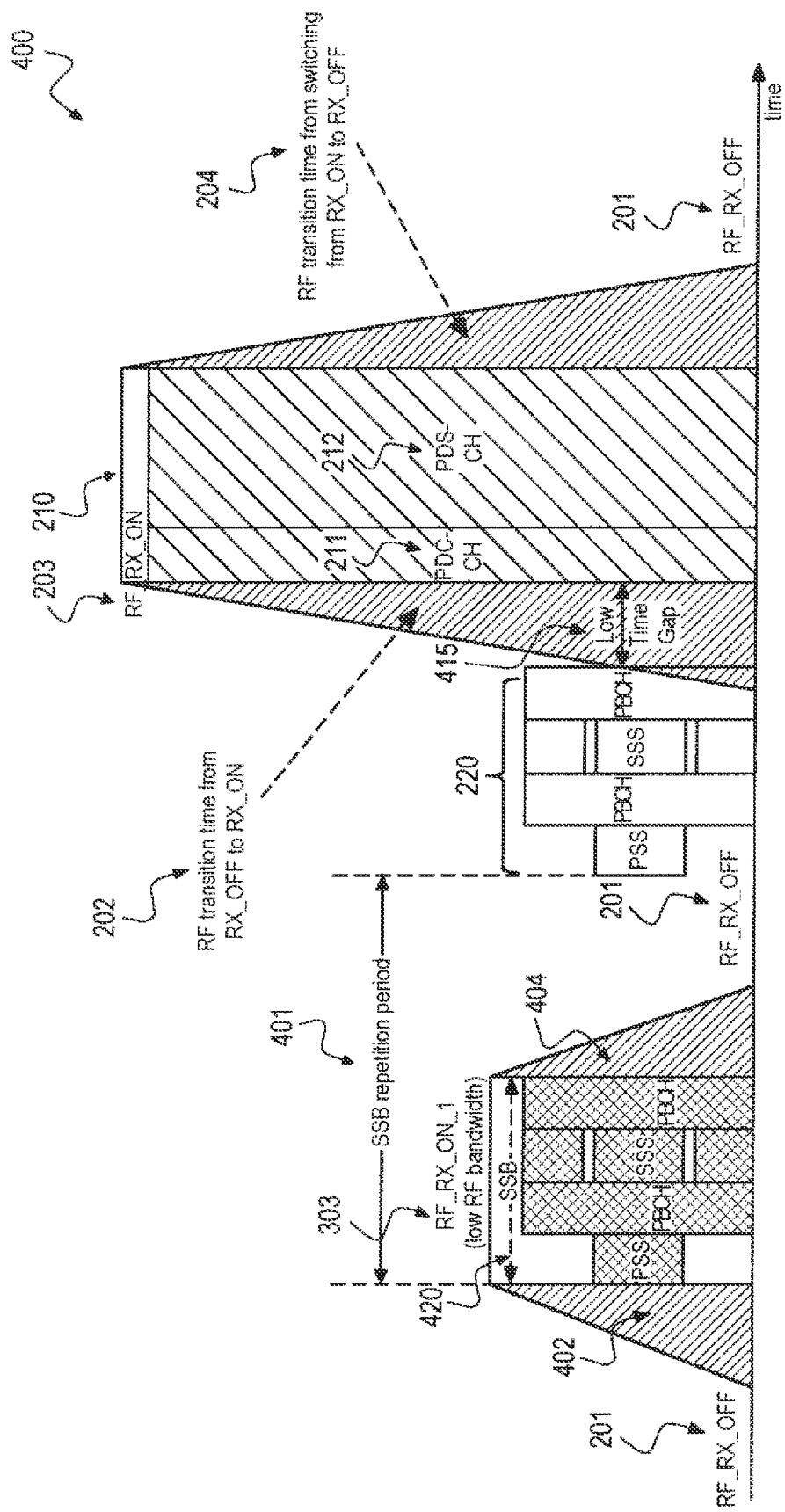
FIG. 4 is a schematic power diagram illustrating an example RX on-duration split by selecting a second time advanced SSB repetition for RX on overhead reduction according to the disclosure.

FIG. 4 is a schematic power diagram illustrating an example RX on-duration split by selecting a second time advanced SSB repetition 420 for RX on overhead reduction according to the disclosure. FIG. 4 illustrates a further extension to the first method (extended Method 1) according to the disclosure. FIG. 4 also shows a specific power switching pattern 400 for an RF receiver of a UE.

In this extended Method 1, UE selects a second time advanced SSB repetition instance 420 for "warm-up" operation in the case that the time gap 415 between the first time advanced SSB 220 and the QCLed PO 210 is too short to split the RX on-duration because the time gap length is longer than the RF switching transition time interval of the UE receiver. In this case, based on the run-time UE mobility measurement (e.g. Doppler spread estimation or UE speed sensor results) and based on the configured repetition period 401 of SSB pattern 420, 220, UE could opportunistically select a second repeated SSB instance for "warm-up" operation. The selected second repeated SSB instance 420 is further time advanced by the SSB repetition period 401. Then, UE is able to split the on-duration (RF_RX_ON_1, 303 and RF_RX_ON, 203) and apply different RF bandwidths and central carrier frequencies of the dis-contiguous portions for power reduction.

Figure 5:
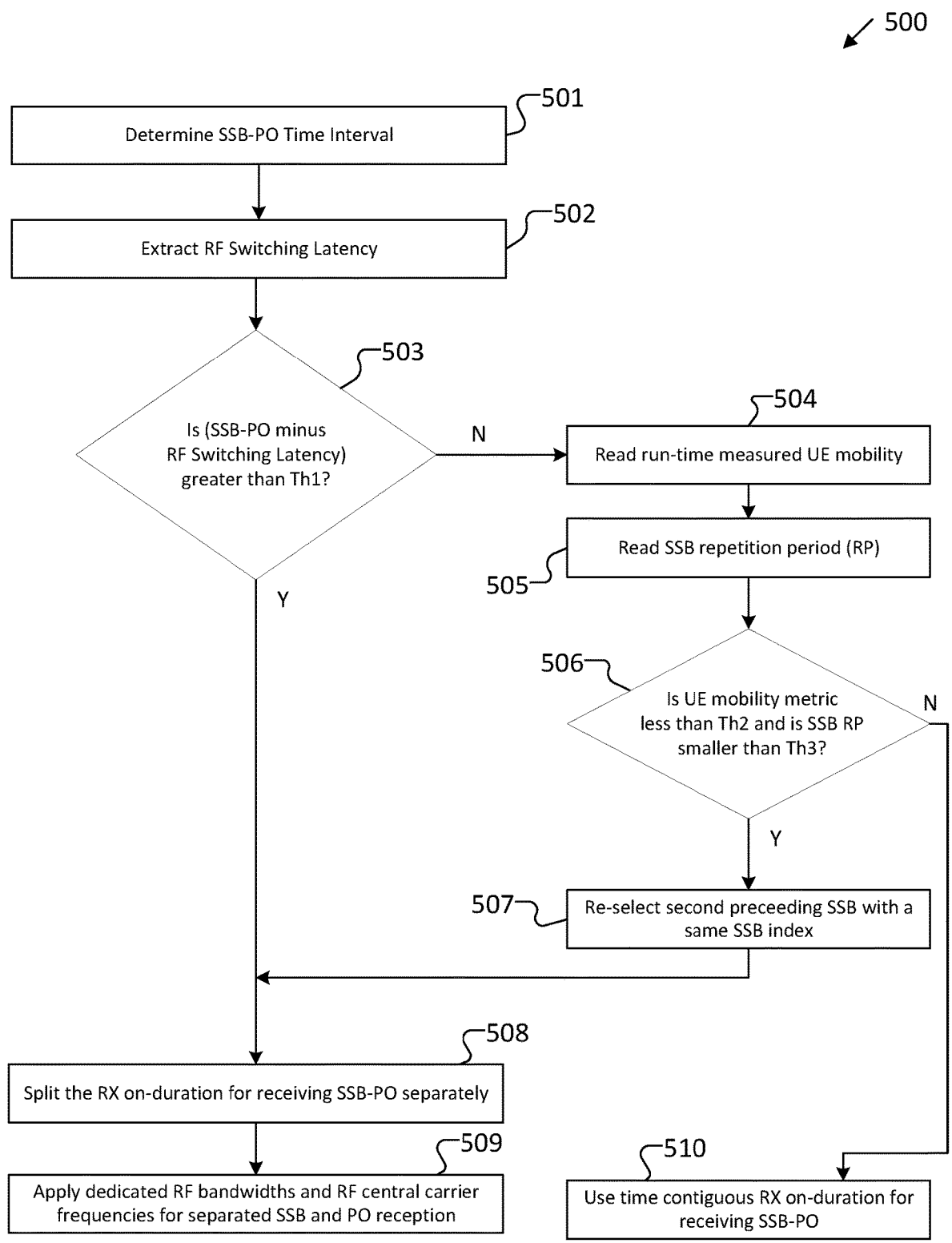
FIG. 5 is a schematic diagram illustrating an exemplary procedure for adaptive RX on-duration split for DRX on-duration overhead reduction and UE power saving in RRC_IDLE state in 5G NR according to the disclosure.

FIG. 5 is a schematic diagram illustrating an exemplary procedure 500 for adaptive RX on-duration split for DRX on-duration overhead reduction and UE power saving in RRC_IDLE state in 5G NR according to the disclosure. The procedure 500 corresponds to Method 1 described above with respect to FIG. 3. The following blocks are performed:

In a first block 501, the time interval between the selected SSB and the QCLed PO is determined. Then, in a second block 502, the RF switching latency (RF_ON to RF_OFF and RF_OFF to RF_ON transition) is extracted from memory. In a third block 503 it is checked if SSB-PO time interval minus RF switching latency is greater than a first threshold Th1. An example value for Th1 can be 70 microseconds. If not, in a fourth block 504, the run-time measured UE mobility metric is read, in a fifth block 505, the SSB repetition period (RP) is read and in a sixth block 506 it is checked if the mobility metric is smaller than a second threshold Th2 and if the SSB repetition period is smaller than a third threshold Th3. As for one example, the mobility metric could be the Doppler spread estimation based on PDSCH DMRS from the PO in historical DRX cycles. As for another example, the mobility metric could be UE speed information obtained from speed sensors within the UE. As for another example, it could be the combination of above two examples. An example value for Th2 can be 30 km/h. An example value for Th3 can be 40 milliseconds. If condition of sixth block 506 is not fulfilled, in a tenth block 510 time contiguous RX on-duration is used for receiving the SSB and the QCLed PO. If yes, in a seventh block 507, a second preceeding SSB with a same SSB index is re-selected, which is further time advanced by SSB_RP and in an eighth block 508, the RX on-duration is split for receiving the (re)selected SSB and the QCLed PO separately. If the result of the third block 503 is yes, the eighth block 508 is also processed. Then, in a ninth block 509 following the eight block 508, dedicated RF bandwidths and RF central carrier frequencies are applied for separated SSB reception and PO reception.

In a second method, referred to as Method 2, the core idea is to opportunistically skip a sub-set of reference symbols (heterogeneous symbols) within the warm-up SSB 220, when the related channel KPIs have high error margin. Note that, SSB 220 contains three types of reference symbols (PSS 221, SSS 223 and PBCH DMRS 222, 224). Due to different natures of the waveforms, different types of reference symbols results in different capabilities for tracking different channel parameters in different channel conditions. For example, PSS 221 and SSS 223 have much better capability to track timing drifts with higher timing uncertainties than DMRS 222, 224. That is because PSS 221 and SSS 223 have much higher density of reference sub-carriers allocation than PBCH DMRS 222, 224. For example, DMRS 222, 224 based measurements are much better robust against colliding interferences than PSS 221. That is because PSS 221 have only 3 alternative preamble sequences (determined by modulo-3 value of the physical cell ID). When a neighboring cell SSB with the same PSS sequence is time and frequency colliding with the "warm up" SSB 220, the PSS 221 may not be used for "warm-up" measurement (e.g. RSRP measurement, AGC measurement or fine timing offset measurement) and can be skipped.

Therefore, according to Method 2, UE can adaptively down-select the best suitable reference symbols within a SSB 220 for the DRX "warm-up" processing, based on the run-time channel conditions. UE can meanwhile disable the reception for the un-selected SSB 220 symbols in order to opportunistically reduce the "warm-up" overhead. In particular, when the time-gap between a SSB 220 and the QCLed PO 210 is too short so that they cannot be split into dis-contiguous portions, skipping the ending symbols within the SSB 220 can relax such time-gap and can make the split possible: this further results in bandwidth overhead reduction.

Figure 6:
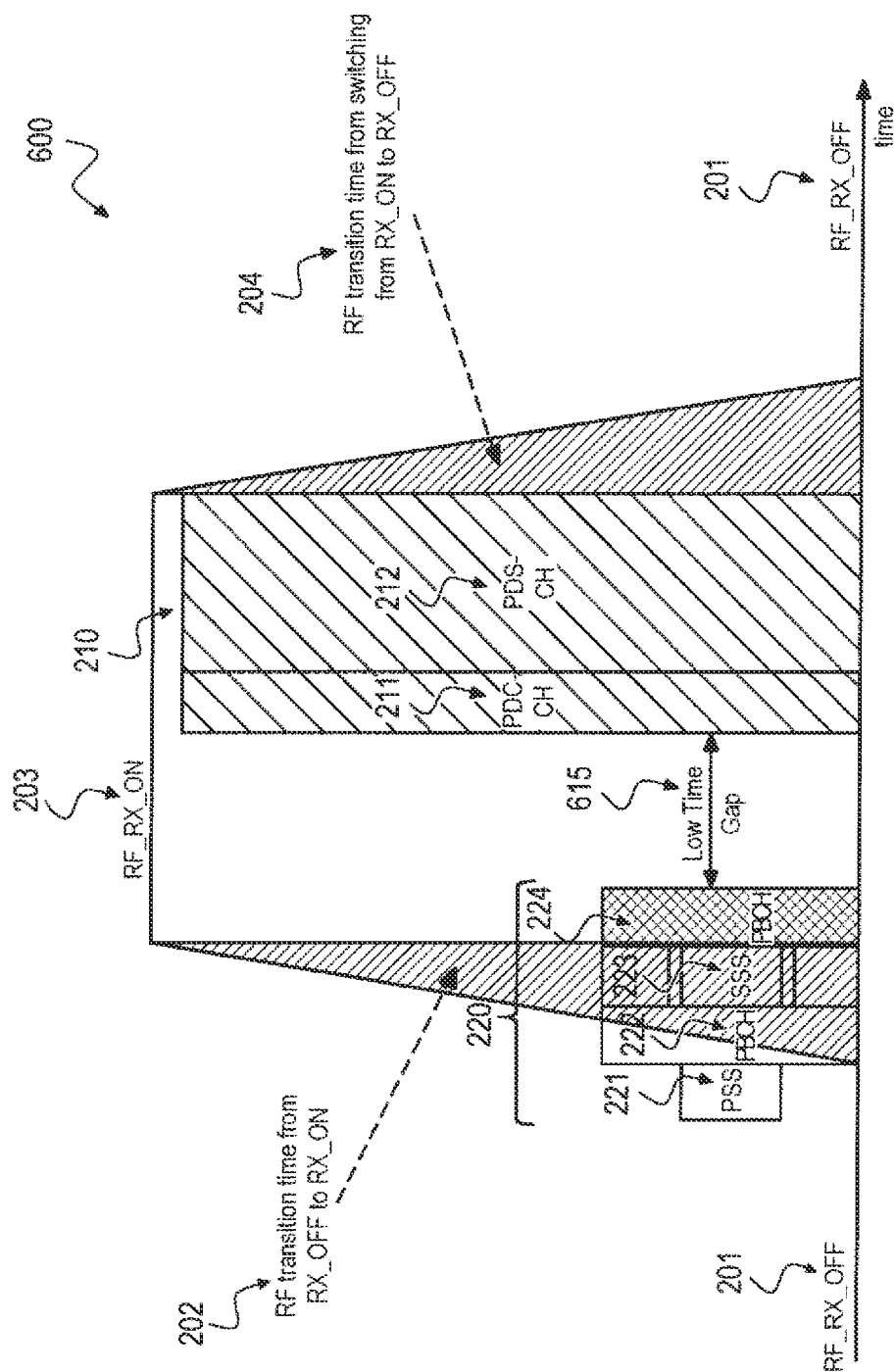
FIG. 6 is a schematic power diagram illustrating an example of SSB warm-up overhead reduction by opportunistically skipping preceding reference symbols within the SSB according to the disclosure.

FIG. 6 is a schematic power diagram illustrating an example of SSB warm-up overhead reduction by opportunistically skipping preceding reference symbols within the SSB 220 according to the disclosure. FIG. 6 also shows a specific power switching pattern 600 for an RF receiver of a UE. FIG. 6 illustrates the second method (Method 2) according to the disclosure in which SSB warm-up overhead further reduction is achieved by adaptive SSB reference symbol down-selection.

In FIG. 6, only the last PBCH symbol 224 (containing the DMRS) within a SSB 220 is used for DRX warm-up, while the three other symbols (PSS 221, PBCH 222, SSS, 223) are skipped to reduce the warm-up overhead. The skipping of preceding reference symbols within a SSB 220 according to the example in FIG. 6 can be opportunistically activated when the timing drift uncertainty is predicted to be low: e.g. shorter DRX cycle length or lower UE mobility (Note that, timing drift uncertainty can be predicted based on timing error estimation based on DMRS within the PO from previous DRX cycles). In addition, note that, in the FIG. 6 example, the time-gap 615 between the SSB 220 and the QCLed PO 210 is too short for on-duration splitting and that is why SSB 220 and PO 210 reception is based on the same RF BW and sampling rate. However, the leading SSB 220 symbols 221, 222, 223 down-selection can also be applied in a same way when SSB 220 and the QCLed PO 210 is split into dis-contiguous on-duration portions with different RF BWs (as an extension from the example in FIG. 3). Further note that, the example in FIG. 6 can be extended to skip other preceding reference symbols combinations: for example, skipping PSS 221 and the first PBCH symbol 222 while keeping SSS 223 and the last PBCH symbol 224.

Figure 7:
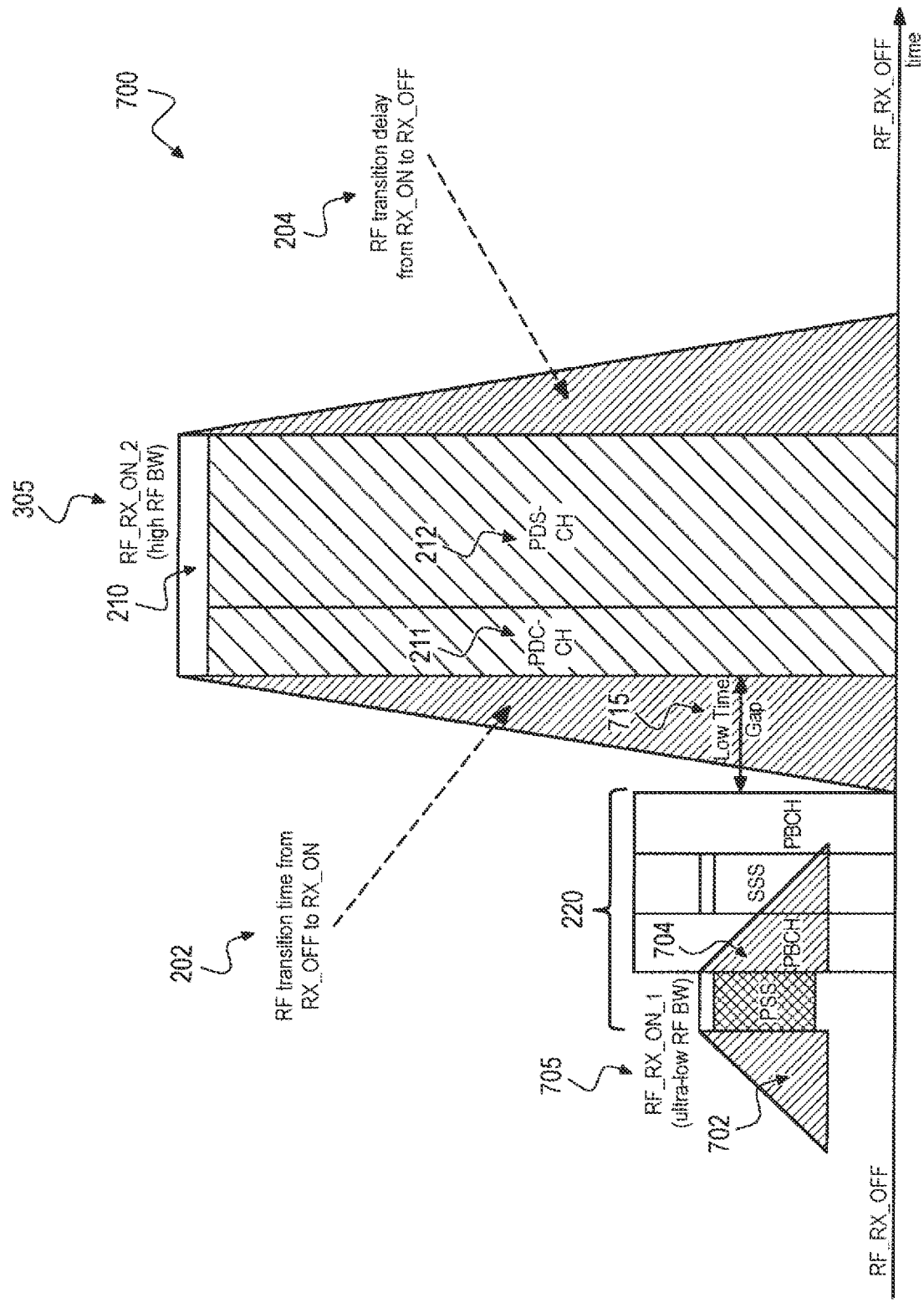
FIG. 7 is a schematic power diagram illustrating an example of SSB warm-up overhead reduction by opportunistically skipping succeeding reference symbols within the SSB according to the disclosure.

FIG. 7 is a schematic power diagram illustrating an example of SSB warm-up overhead reduction by opportunistically skipping succeeding reference symbols within the SSB (low time gap case) according to the disclosure. FIG. 7 also shows a specific power switching pattern 700 for an RF receiver of a UE.

In this example, only the first PSS symbol 221 within a SSB 220 is used for DRX warm-up, while the three other symbols (PBCH 224, SSS 223 and PBCH 222) are skipped to reduce the warm-up overhead. The example in FIG. 7 illustrates opportunistically activation when the warm-up SSB 220 is detected to be free from colliding interference from other neighboring cell SSBs with a same PSS sequence. Note that colliding SSB interferences can be blindly detected by SSS based neighboring cell ID detection in a previous DRX on-duration.

In particular, in the example of FIG. 7, the true time-gap 715 between a SSB 220 and the associated PO 210 is too short so that they cannot be split into dis-contiguous portions. However, by skipping the ending symbols 224, 223, 222 within the SSB 220, the time-gap 715 is extended so that splitting the on-duration becomes possible: this results in optimal RF bandwidth and sampling rate setting for SSB 220 reception and PO 210 reception separately, and it results in minimal SSB "warm-up" overhead. The ON-to-OFF transition from RF_RX_ON_1 705 of PSS of SSB 220 to RF_RX_OFF 201 and the OFF-to-ON transition 202 from RF_RX_OFF 201 to RF_RX_ON_2 (high RF BW) 305 of PO 210 are short enough to enable the split into dis-contiguous portions. Note that method 2 is also applicable when the time gap between the SSB 220 and the QCLed PO is long. One example is shown in FIG. 8.

Figure 8:
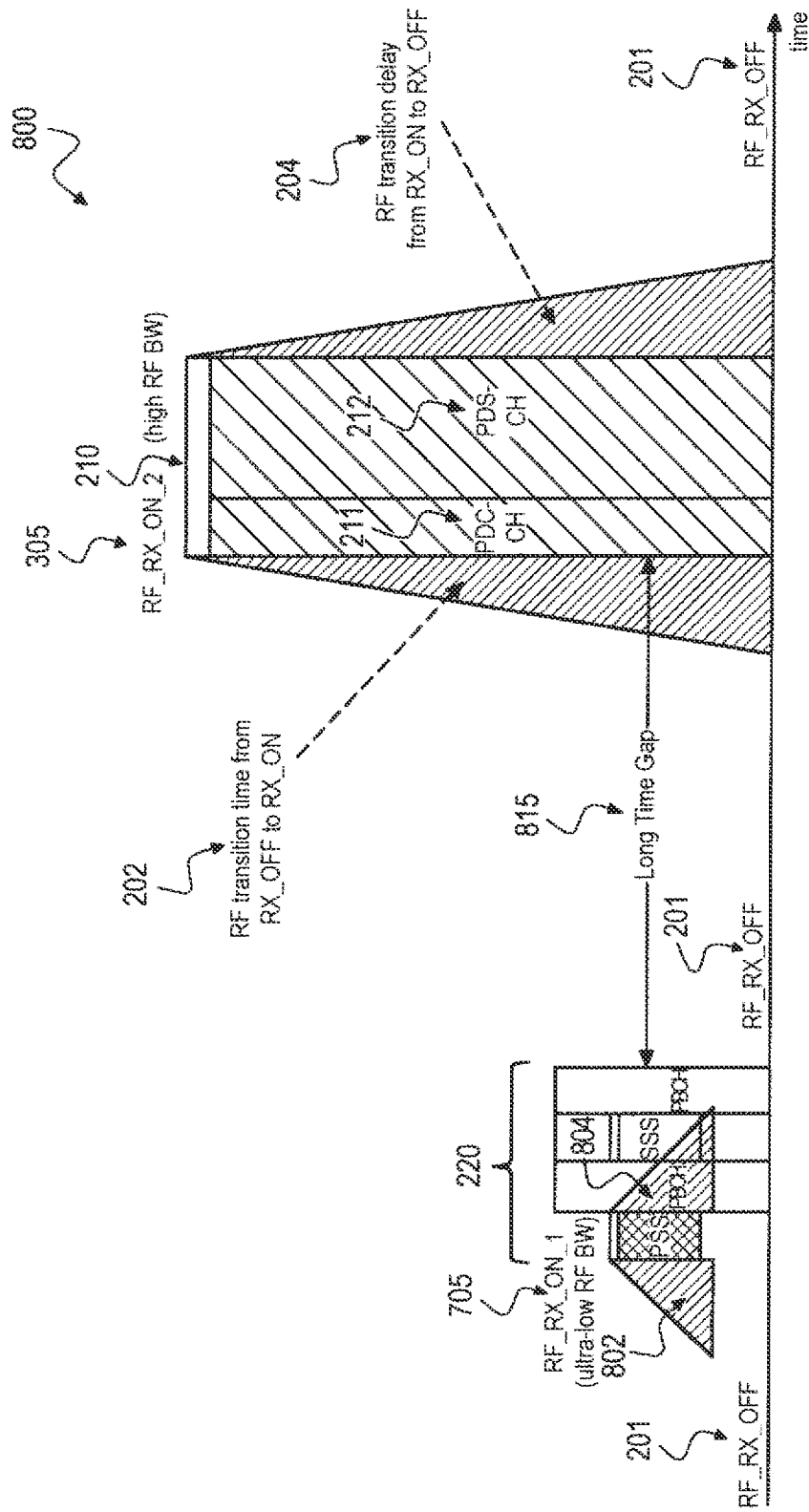
FIG. 8 is a schematic power diagram illustrating an example of SSB warm-up overhead reduction by opportunistically skipping succeeding reference symbols within the SSB: long time gap case according to the disclosure.

FIG. 8 is a schematic power diagram illustrating an example of SSB 220 warm-up overhead reduction by opportunistically skipping succeeding reference symbols within the SSB, i.e. the long time gap 815 case according to the disclosure. In this example, only the first PSS symbol 221 within a SSB 220 is used for DRX warm-up, while the three other symbols (PBCH 224, SSS 223 and PBCH 222) are skipped to reduce the warm-up overhead. FIG. 8 also shows a specific power switching pattern 800 for an RF receiver of a UE.

In particular, in the example of FIG. 8, the time-gap 815 between a SSB 220 and the associated PO 210 is long but they can nevertheless be split into dis-contiguous portions. The ON-to-OFF transition 804 from RF_RX_ON_1 705 of PSS of SSB 220 to RF_RX_OFF 201 and the OFF-to-ON transition 202 from RF_RX_OFF 201 to RF_RX_ON_2 (high RF BW) 305 of PO 210 are short enough (but they can be even longer) to still enable the split into dis-contiguous portions.

Figure 9:
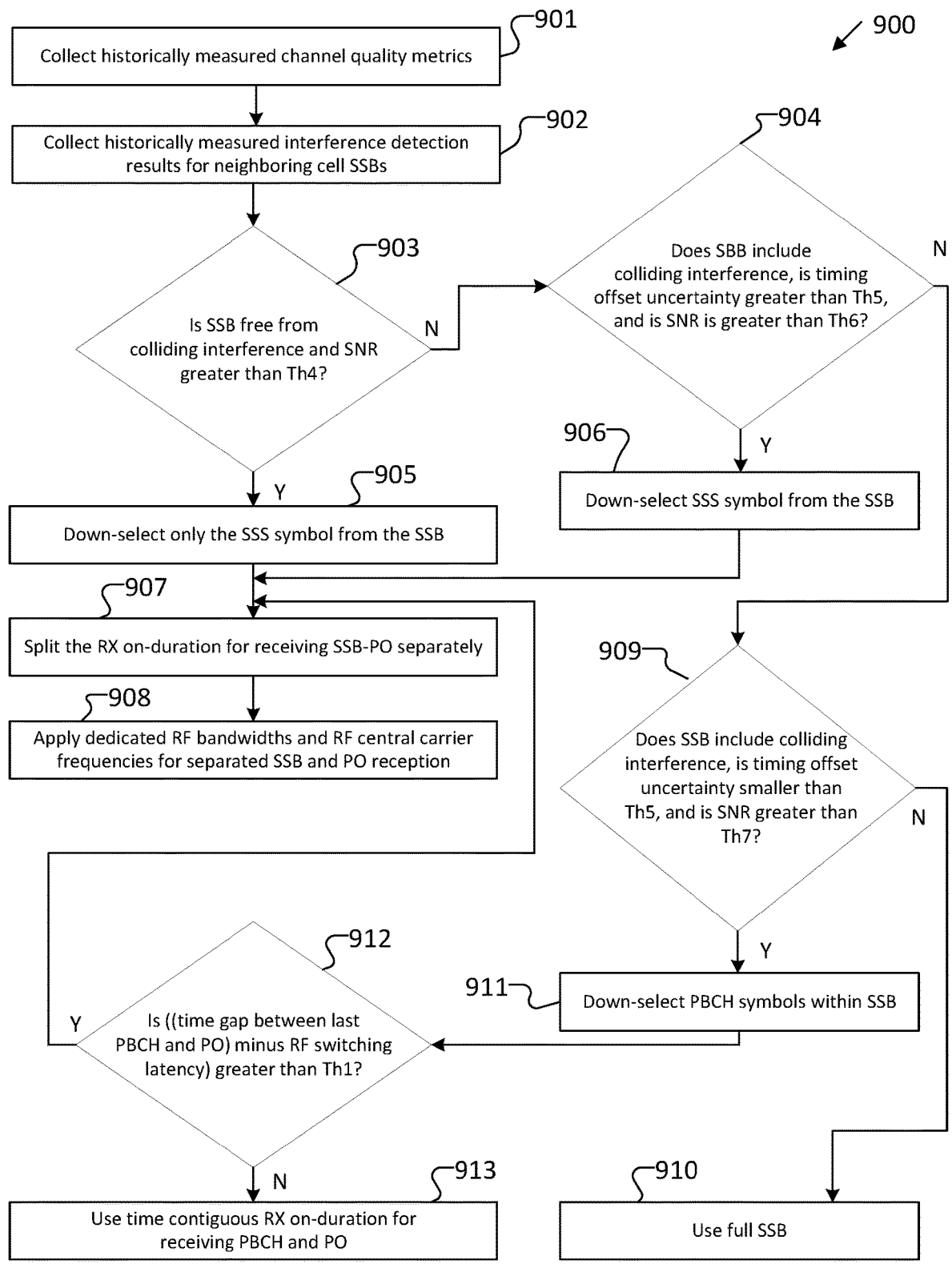
FIG. 9 is a schematic diagram illustrating an exemplary procedure for adaptive SSB symbol down-selection for DRX on-duration overhead reduction and UE power saving in RRC_IDLE state in 5G NR according to the disclosure.

FIG. 9 is a schematic diagram illustrating an exemplary procedure for adaptive SSB symbol down-selection for DRX on-duration overhead further reduction and UE further power saving in RRC_IDLE state in 5G NR according to the disclosure.

The procedure 900 starts with a first block 901 collecting the historically measured channel quality metrics (e.g. timing uncertainty, SNR). In a second block 902, the historically measured interference detection results are collected for the neighboring cell SSBs which are time and frequency colliding with the selected "warm-up" SSB. In a third block 903 a check is performed if the selected SSB is free from colliding interference and SNR is greater than a fourth threshold Th4. An example value for Th4 can be 6 dB. If yes, in a fifth block 905 down-selecting only the PSS symbol from the SSB for PO "warm-up" operation is performed. If result of check 903 is no, a further check in fourth block 904 is performed if SSB contains colliding interferences and timing offset uncertainty is greater than a fifth threshold Th5 and SNR is greater than a sixth threshold Th6. An example value for Th5 can be 5 microseconds. An example value for Th6 can be 3 dB. If yes, in a sixth block 906 down-selecting SSS symbol from the SSB for PO "warm-up" operation is performed. After fifth block 905 and sixth block 906 in a seventh block 907 the RX on duration is split for receiving the down-select reference symbol from SSB and for receiving the QCLed PO, separately. Then, in an eighth block 908, dedicated RF bandwidths and RF central carrier frequencies are applied for receiving the down-selected reference symbols from SSB, and for receiving PO reception, separately.

If result of check 904 is no, a further check is performed in a ninth block 909 if SSB contains colliding interferences and timing offset uncertainty is smaller than a fifth threshold Th5 and SNR is greater than a seventh threshold Th7. An example value for Th5 can be 2 microseconds. An example value for Th7 can be 0 dB. If no, in a tenth block 910 a jump is performed to the procedure described above with respect to FIG. 5, where full SSB is used. If result of check 909 is yes, in an eleventh block 911 down-selecting PBCH symbols within the SSB for PO "warm-up" operation is performed. Then, in a twelfth block 912 a check is performed if (time gap between the last PBCH symbol and the PO) minus RF switching latency is greater than the first threshold Th1. If yes, the procedure 900 jumps from block 912 to the seventh block 907; if no, in a thirteenth block time contiguous RX on-duration is used for receiving the PBCH DMRS symbols and the QCLed PO.

Figure 10:
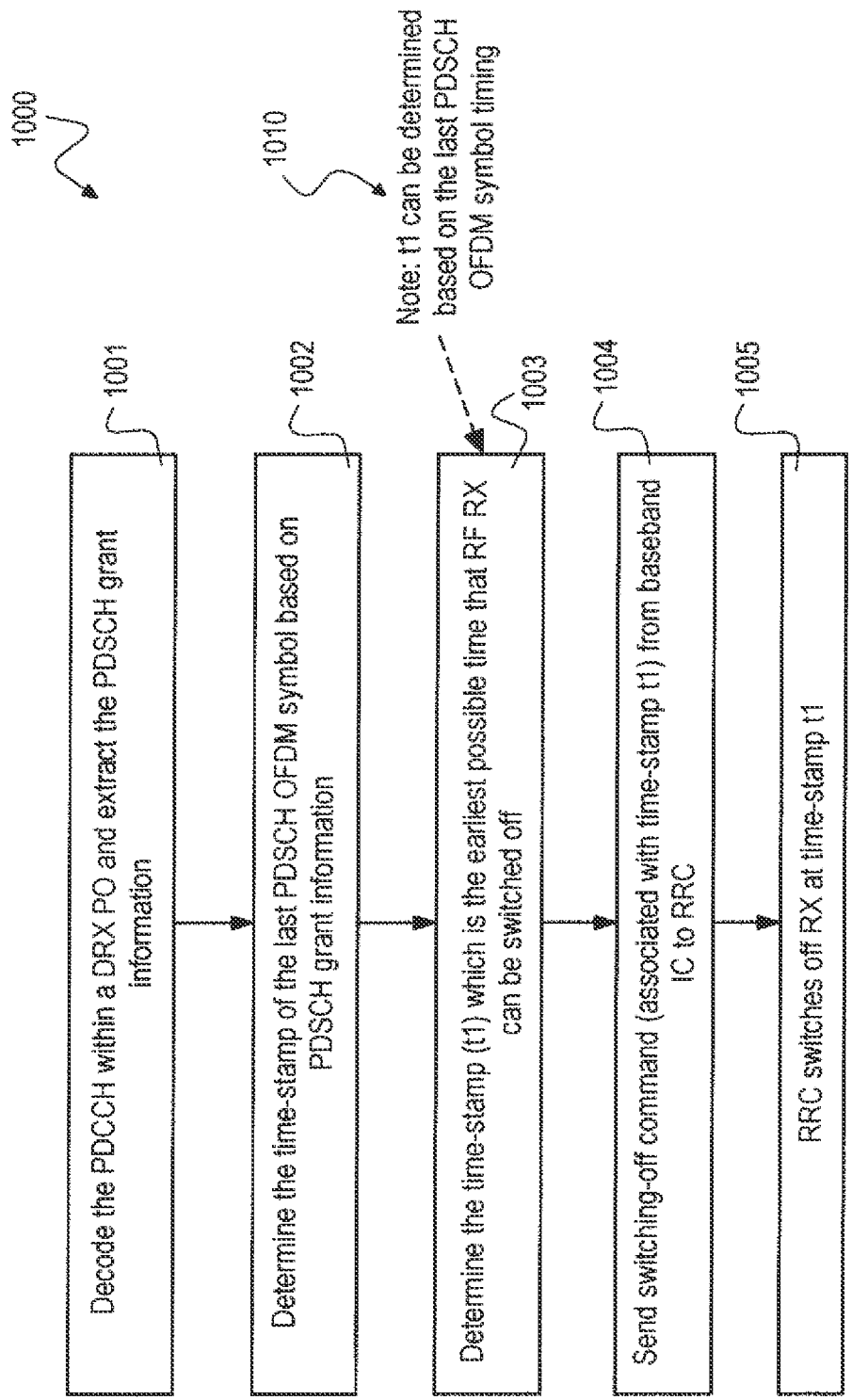
FIG. 10 is a schematic diagram illustrating an exemplary procedure for DRX on-duration overhead further reduction by adapting PO on-duration by PDSCH grant information within the PO according to the disclosure.

FIG. 10 is a schematic diagram illustrating an exemplary procedure 1000 for DRX on-duration overhead further reduction by adapting PO on-duration by PDSCH grant information within the PO according to the disclosure.

Besides of the concepts described above, further two extensions can be made for further on-duration overhead reduction, as described in the following. As one extension, in ultra-low mobility scenarios, "warm-up" SSB can be totally switched off in a sub-set of DRX cycles while switched on in the remaining sub-set of DRX cycles.

As another extension, for paging occasion (PO) reception, instead of keeping the on-duration for PO reception always to be 1 NR DL slot duration, it can be adapted to the PDSCH grant information within the PO. That means, RF_RX can be switched off immediately after receiving the last OFDM symbol of the PDSCH grant, which can be scheduled earlier than the slot boundary. FIG. 10 shows the example procedure of this implementation.

In a first block 1001 the PDCCH within a DRX PO is decodes and the PDSCH grant information is extracted. In a second block 1002, the time-stamp of the last PDSCH OFDM symbol is determined based on PDSCH grant information. In a third block the time stamp (t1) is determined which is the earliest possible time that RF_RX can be switched off. Note that t1 can be determined based on the last PDSCH OFDM symbol timing 1010. In a fourth block 1004, switching off command (associated with time stamp t1) is sent from baseband IC to RRC. In a fifth block 1005, RRC switches of RX at time stamp t1.

Figure 11:
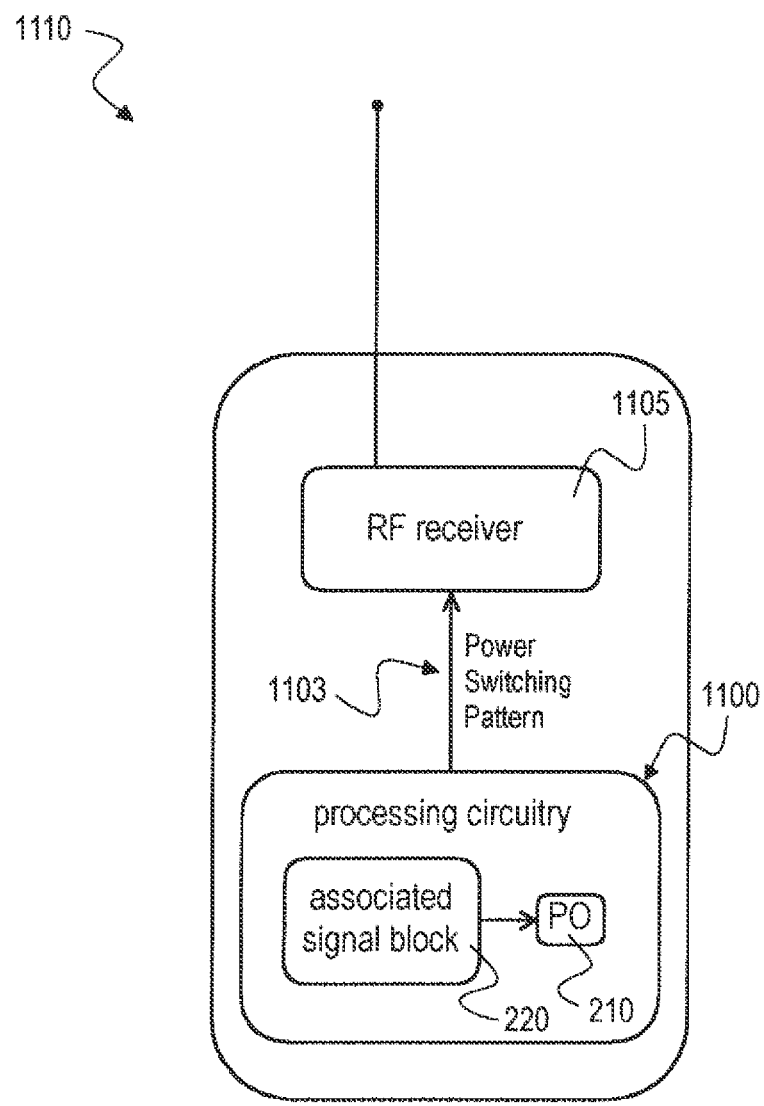
FIG. 11 is a block diagram illustrating an exemplary User Equipment (UE) and an exemplary processing circuit for the UE according to the disclosure.

FIG. 11 is a block diagram illustrating an exemplary User Equipment (UE) 1110 and an exemplary processing circuit 1100 for the UE 1110 according to the disclosure. The UE 1110 may correspond to a UE 110 as shown in FIG. 1.

The UE 1110 comprises a Radio Frequency (RF) receiver 1105 for receiving RF signals from a serving cell, e.g. a base station 120 as shown in FIG. 1. The UE 1110 further comprises a processing circuitry 1100 (or circuit) coupled to the RF receiver 1105.

The processing circuitry 1100 is configured to set a power switching pattern 1103 of the RF receiver 1105 for UE power saving in Discontinuous Reception, DRX, Radio Resource Control, RRC, IDLE mode based on a paging occasion, PO 210, and a signal block 220 associated with the PO 210. The power switching pattern 1103 describes the switching procedure for the RF receiver 1105 in time and frequency, e.g. as described above with respect to FIG. 2, 3, 4, 6, 7, 8. In particular the switching pattern describes when to perform on-to-off transitions and off-to-on transitions and for which bandwidth to perform such transitions. The switching pattern may be determined based on known information about PO 210 and SSB 220, e.g. known by the base station and received from the base station.

The PO 210 may correspond to the PO 210 described above with respect to FIGS. 2 to 10. The signal block 220 associated with the PO 210 may correspond to the SSB 220 described above with respect to FIGS. 2 to 10.

The processing circuitry 1100 is configured to set the power switching pattern based on a time gap 215, 315, 415, 615, 715, 815 between the PO 210 and the signal block 220 associated with the PO 210, e.g. as described above with respect to FIG. 2, 3, 4, 6, 7, 8.

The power switching pattern 1103 can comprise a switching off 304 during at least part of the time gap 315 between the PO 210 and the signal block 220 associated with the PO 210, e.g. as shown in FIG. 3.

The processing circuitry 1100 can be configured to set the power switching pattern 1103 of the RF receiver 1105 based on channel condition measurements. The processing circuitry 1100 can be configured to set the power switching pattern 1103 based on a central carrier of the PO 210 and a central carrier of the signal block 220 associated with the PO 210. The processing circuitry 1100 can be configured to set the power switching pattern 1103 based on a bandwidth gap between an RF bandwidth of the PO 210 and an RF bandwidth of the signal block 220 associated with the PO, e.g. as shown in FIG. 3 where the bandwidth gap is between RF_RX_ON_1 303 and RF_RX_ON_2 (high RF BW) 305. The power switching pattern 1103 may comprise a switching off within at least part of the bandwidth gap between the PO 210 and the signal block 220 associated with the PO. E.g. as shown in FIG. 3, the PO 210 follows the signal block 220 associated with the PO 210 in time. The right block in FIG.

3 illustrates the PO 210 which is received prior to the left block that illustrates the SSB 220.

The PO 210 and the signal block 220 associated with the PO may be located within a same DRX cycle. As shown in FIG. 2, 3, 4, 6, 7, 8, the signal block 220 associated with the PO 210 may comprise a quasi co-located synchronization signal block, QCLed SSB, e.g. according to 5G NR standardization as described above.

The power switching pattern 1103 can comprise an OFF to ON transition 202, skipping at least one preceding reference symbols 222, 223, 224 of the signal block 220 associated with the PO 210, e.g. as shown in FIG. 6.

The processing circuitry 1100 may be configured to set the power switching pattern 1103 based on a second time gap between the PO 210 and a second signal block 420 associated with the PO 210, the second signal block 420 preceding the signal block 210 associated with the PO, if a time gap 415 between the PO 210 and the signal block 220 associated with the PO 210 is shorter than a time interval of the OFF to ON transition 202, e.g. as shown in FIG. 4.

The OFF to ON transition 202 of the power switching pattern 300 can be finished before a Physical Broadcast Channel Demodulation Reference Signal, PBCH DMRS, symbol 224 within the signal block 220 associated with the PO 210 preserving the PBCH DMRS symbol 224, e.g. as shown in FIG. 2.

The power switching pattern can comprise an ON to OFF transition 704 skipping at least one succeeding reference symbols 222, 223, 224 of the signal block 220 associated with the PO 210, e.g. as shown in FIG. 7. The ON to OFF transition of the power switching pattern can start after a Primary Synchronization Signal, PSS, symbol 221 within the signal block 220 associated with the PO 210 preserving the PSS symbol 221, e.g. as shown in FIG. 7.

The power switching pattern can comprise an OFF to ON transition 302 preceding the signal block 220 associated with the PO 210 and an ON to OFF transition 304 succeeding the signal block 220 associated with the PO 210.

The processing circuitry 1100 may be configured to set the power switching pattern 1103 of the RF receiver 1105 for a next DRX cycle based on data obtained from one or more preceding DRX cycles.

The processing circuitry 1100 may be configured to: switch off reception of the signal block 220 associated with the PO 210 in a subset of DRX cycles; and switch on reception of the signal block 220 associated with the PO 210 in the remaining subset of DRX cycles.

The processing circuitry 1100 may be configured to schedule an ON to OFF transition after reception of a last Physical Downlink Shared Channel, PDSCH, symbol 212 within the PO 210, e.g. as shown in FIG. 2.

A time interval of the OFF to ON transition and a time interval of the ON to OFF transition may be known from laboratory measurements. A position of the PO 210 and a position of the signal block 220 associated with the PO 210 may be predetermined for each DRX cycle.

Figure 12:
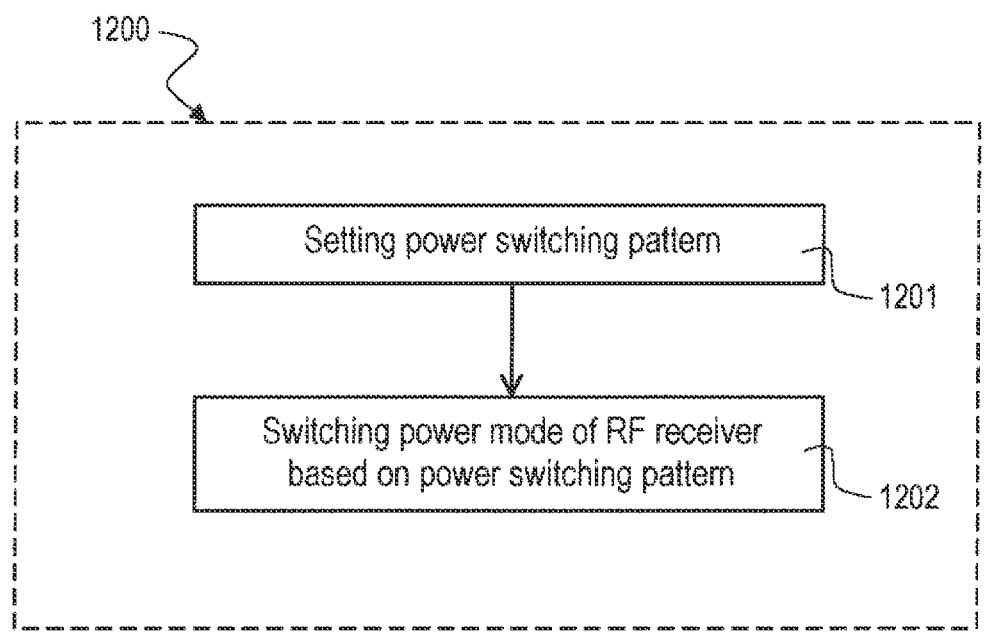
FIG. 12 is a schematic diagram illustrating an exemplary method for power switching a radio frequency (RF) receiver of a UE according to the disclosure.

FIG. 12 is a schematic diagram illustrating an exemplary method 1200 for power switching a radio frequency (RF) receiver 1105 of a UE 1110 according to the disclosure, e.g. of a UE as described in FIG. 11.

The method 1200 comprises setting 1201 a power switching pattern of the RF receiver for UE power saving in Discontinuous Reception, DRX, Radio Resource Control, RRC, IDLE mode based on a paging occasion, PO, and a signal block associated with the PO, e.g. as described above with respect to FIGS. 3 to 11.

The method 1200 further comprises switching 1202 a power mode of the RF receiver based on the power switching pattern, e.g. as described above with respect to FIGS. 3 to 11.

The method 1200 may further comprise setting the power switching pattern based on a time gap between the PO and the signal block associated with the PO. The power switching pattern can comprise a switching off during at least part of the time gap between the PO and the signal block associated with the PO, e.g. as shown in FIG. 3.

The present disclosure also supports a computer program product including computer executable code or computer executable instructions that, when executed, causes at least one computer to execute the performing and computing blocks described herein, in particular the methods described above with respect to FIGS. 5 to 8 and 11 and the computing blocks described above with respect to FIGS. 2, 9 and 10. Such a computer program product may include a non-transient readable storage medium storing program code thereon for use by a processor, the program code comprising instructions for performing the methods or the computing blocks as described above.

The following examples pertain to further aspects. Example 1 is a processing circuit for a User Equipment, UE, wherein the UE comprises a radio frequency, RF, receiver, wherein the processing circuit is configured to set a power switching pattern of the RF receiver for UE power saving in Discontinuous Reception, DRX, Radio Resource Control, RRC, IDLE mode based on a paging occasion, PO, and a signal block associated with the PO.

In Example 2, the subject matter of Example 1 can optionally include that the processing circuit is configured to set the power switching pattern based on a time gap between the PO and the signal block associated with the PO.

In Example 3, the subject matter of Example 2 can optionally include that the power switching pattern can comprise a switching off during at least part of the time gap between the PO and the signal block associated with the PO.

In Example 4, the subject matter of Example 1 or 2 can optionally include that the processing circuit is configured to set the power switching pattern of the RF receiver based on channel condition measurements.

In Example 5, the subject matter of Example 1 or 2 can optionally include that the processing circuit is configured to set the power switching pattern based on a central carrier of the PO and a central carrier of the signal block associated with the PO.

In Example 6, the subject matter of Example 1 or 2 can optionally include that the processing circuit is configured to set the power switching pattern based on a bandwidth gap between an RF bandwidth of the PO and an RF bandwidth of the signal block associated with the PO.

In Example 7, the subject matter of Example 6 can optionally include that the power switching pattern comprises a switching off within at least part of the bandwidth gap between the PO and the signal block associated with the PO.

In Example 8, the subject matter of Example 1 or 2 can optionally include that the PO and the signal block associated with the PO are located within a same DRX cycle.

In Example 9, the subject matter of Example 1 or 2 can optionally include that the signal block associated with the PO comprises a quasi co-located synchronization signal block, QCLed SSB.

In Example 10, the subject matter of Example 1 or 2 can optionally include that the power switching pattern can comprise an OFF to ON transition, skipping at least one preceding reference symbols within the signal block associated with the PO.

In Example 11, the subject matter of Example 10 can optionally include that the processing circuit is configured to activate preceding Primary Synchronization Signal, PSS, symbol skipping if a received power of a colliding PSS from a neighbor cell is higher than a pre-defined threshold while a timing offset error is lower than a second pre-defined threshold.

In Example 12, the subject matter of Example 10 or 11 can optionally include that the processing circuit is configured to set the power switching pattern based on a second time gap between the PO and a second signal block associated with the PO, the second signal block preceding the signal block associated with the PO, if a time gap between the PO and the signal block associated with the PO is shorter than a transition time interval of the RF receiver.

In Example 13, the subject matter of Example 12 can optionally include that a sum of an OFF to ON transition and an ON to OFF transition of the power switching pattern corresponds to the transition time interval of the RF receiver.

In Example 14, the subject matter of any one of Examples 11 or 12 can optionally include that the OFF to ON transition of the power switching pattern is finished before a Physical Broadcast Channel Demodulation Reference Signal, PBCH DMRS, symbol within the signal block associated with the PO preserving the PBCH DMRS symbol.

In Example 15, the subject matter of Example 1 or 2 can optionally include that the power switching pattern can comprise an ON to OFF transition skipping at least one succeeding reference symbols within the signal block associated with the PO.

In Example 16, the subject matter of Example 1 or 2 can optionally include that the processing circuit is configured to activate succeeding PBCH DMRS symbol skipping if a received power of a colliding PSS from a neighbor cell is lower than a pre-defined threshold while a timing offset error is higher than a second pre-defined threshold.

In Example 17, the subject matter of Example 15 can optionally include that the ON to OFF transition of the power switching pattern starts after a Primary Synchronization Signal, PSS, symbol within the signal block associated with the PO preserving the PSS symbol.

In Example 18, the subject matter of Example 1 or 2 can optionally include that the power switching pattern comprises an OFF to ON transition preceding a first reference symbol within the signal block associated with the PO and an on/off transition succeeding a last reference symbol within the signal block associated with the PO.

In Example 19, the subject matter of Example 1 or 2 can optionally include that the processing circuit is configured to set the power switching pattern of the RF receiver for a next DRX cycle based on channel parameter estimations on reference signals received from one or more preceding DRX cycles.

In Example 20, the subject matter of Example 1 or 2 can optionally include that the processing circuit is configured to: switch off reception of the signal block associated with the PO in a subset of DRX cycles; and switch on reception of the signal block associated with the PO in the remaining subset of DRX cycles.

In Example 21, the subject matter of Example 1 or 2 can optionally include that the processing circuit is configured to determine a ratio between DRX cycles with SSB off and a total number of DRX cycles based on DRX cycle length and UE mobility parameter estimation.

In Example 22, the subject matter of Example 1 or 2 can optionally include that the processing circuit is configured to schedule an ON to OFF transition after reception of a last Physical Downlink Shared Channel, PDSCH, symbol within the PO.

In Example 23, the subject matter of Example 17 can optionally include that a time interval of the OFF to ON transition and a time interval of the on/off transition is known from laboratory measurements.

In Example 24, the subject matter of Example 1 or 2 can optionally include that a position of the PO and a position of the signal block associated with the PO are predetermined for each DRX cycle.

Example 25 is a User Equipment, UE, circuitry, comprising: a Radio Frequency, RF, circuitry, configured to receive RF signals from a serving cell; a baseband circuitry, configured to: set a power switching pattern of the RF circuitry for UE power saving in Discontinuous Reception, DRX, Radio Resource Control, RRC, IDLE mode based on a paging occasion, PO, and a signal block associated with the PO.

In Example 26, the subject matter of Example 25 can optionally include that the signal block associated with the PO comprises a quasi co-located synchronization signal block, QCLed SSB.

In Example 27, the subject matter of Example 25 or 26 can optionally include that a position of the PO and a position of the signal block associated with the PO are pre-configured and pre-indicated from gNB to UE for each DRX cycle.

In Example 28, the subject matter of Example 25 or 26 can optionally include that the UE circuitry is configured to: set the power switching pattern based on at least one of the following: a time gap between the PO and the signal block associated with the PO, a central carrier of the PO and a central carrier of the signal block associated with the PO, a bandwidth gap between an RF bandwidth of the PO and an RF bandwidth of the signal block associated with the PO.

In Example 29, the subject matter of Example 25 or 26 can optionally include that the baseband circuitry is configured to send a power switching command for UE power saving to the RF circuitry based on the power switching pattern.

In Example 30, the subject matter of Example 25 or 26 can optionally include that the baseband circuitry is configured to: decode a Physical Downlink Control Channel, PDCCH, within the PO and extract Physical Downlink Shared Channel, PDSCH, grant information; determine a time stamp of a last PDSCH symbol within the PO based on the PDSCH, grant information; determine a switch-off time based on the time stamp; and send a switch-off command associated with the switch-off time to the RF circuitry for making the RF circuitry switching-off reception at the switch-off time.

Example 31 is a method for power switching a radio frequency, RF, receiver of a User Equipment, UE, wherein the method comprises: setting a power switching pattern of the RF receiver for UE power saving in Discontinuous Reception, DRX, Radio Resource Control, RRC, IDLE mode based on a paging occasion, PO, and a signal block associated with the PO; and switching a power mode of the RF receiver based on the power switching pattern.

In Example 32, the subject matter of Example 31 can optionally include: setting the power switching pattern based on a time gap between the PO and the signal block associated with the PO.

In Example 33, the subject matter of Example 32 can optionally include that the power switching pattern can comprise a switching off during at least part of the time gap between the PO and the signal block associated with the PO.

In Example 34, the subject matter of Example 31 or 32 can optionally include: setting the power switching pattern based on a central carrier of the PO and a central carrier of the signal block associated with the PO.

In Example 35, the subject matter of Example 31 or 32 can optionally include: setting the power switching pattern based on a bandwidth gap between an RF bandwidth of the PO and an RF bandwidth of the signal block associated with the PO.

In Example 36, the subject matter of Example 35 can optionally include that the power switching pattern comprises a switching off during at least part of the bandwidth gap between the PO and the signal block associated with the PO.

In Example 37, the subject matter of Example 31 or 32 can optionally include that the PO follows the signal block associated with the PO in time.

In Example 38, the subject matter of Example 31 or 32 can optionally include that the PO and the signal block associated with the PO are located within a same DRX cycle.

In Example 39, the subject matter of Example 31 or 32 can optionally include that a position of the PO and a position of the signal block associated with the PO within a subframe are predetermined for each DRX cycle.

In Example 40, the subject matter of Example 31 or 32 can optionally include that the signal block associated with the PO comprises a quasi co-located synchronization signal block, QCLed SSB.

In Example 41, the subject matter of Example 31 or 32 can optionally include that the power switching pattern comprises an OFF to ON transition, skipping at least one preceding reference symbols of the signal block associated with the PO.

In Example 42, the subject matter of Example 31 or 32 can optionally include that the OFF to ON transition of the power switching pattern is finished before a Physical Broadcast Channel Demodulation Reference Signal, PBCH DMRS, symbol within the signal block associated with the PO preserving the PBCH DMRS symbol.

In Example 43, the subject matter of Example 31 or 32 can optionally include that the power switching pattern comprises an ON to OFF transition skipping at least one succeeding reference symbols of the signal block associated with the PO.

In Example 44, the subject matter of Example 43 can optionally include that the ON to OFF transition of the power switching pattern starts after a Primary Synchronization Signal, PSS, symbol within the signal block associated with the PO preserving the PSS symbol.

In Example 45, the subject matter of Example 31 or 32 can optionally include that the power switching pattern comprises an OFF to ON transition preceding the signal block associated with the PO and an ON to OFF transition succeeding the signal block associated with the PO.

In Example 46, the subject matter of Example 45 can optionally include that a time interval of the OFF to ON transition and a time interval of the ON to OFF transition is known from laboratory measurements.

In Example 47, the subject matter of Example 31 or 32 can optionally include: setting the power switching pattern of the RF receiver based on channel condition measurements.

In Example 48, the subject matter of Example 31 or 32 can optionally include: setting the power switching pattern of the RF receiver for a next DRX cycle based on data obtained from one or more previous DRX cycles.

In Example 49, the subject matter of Example 31 or 32 can optionally include: switching off reception of the signal block associated with the PO in a subset of DRX cycles; and switching on reception of the signal block associated with the PO in the remaining subset of DRX cycles.

In Example 50, the subject matter of Example 31 or 32 can optionally include: switching off reception of the PO with reception of Physical Downlink Shared Channel, PDSCH, grant information within the PO.

Example 51 is a device for power switching a radio frequency, RF, receiver of a User Equipment, UE, wherein the device comprises: means for setting a power switching pattern of the RF receiver for UE power saving in Discontinuous Reception, DRX, Radio Resource Control, RRC, IDLE mode based on a paging occasion, PO, and a signal block associated with the PO; and means for switching a power mode of the RF receiver based on the power switching pattern.

In Example 52, the subject matter of Example 51 can optionally include: means for setting the power switching pattern based on a time gap between the PO and the signal block associated with the PO.

Example 53 is a system-on-chip, comprising: a Radio Frequency, RF, circuitry, configured to receive RF signals from a serving cell; a baseband circuitry, configured to: set a power switching pattern of the RF circuitry for UE power saving in Discontinuous Reception, DRX, Radio Resource Control, RRC, IDLE mode based on a paging occasion, PO, and a signal block associated with the PO, wherein the baseband circuitry is configured to send a power switching command for UE power switching to the RF circuitry based on the power switching pattern.

In Example 54, the subject matter of Example 53 can optionally include that the signal block associated with the PO comprises a quasi co-located synchronization signal block, QCLed SSB.

Example 55 is a computer readable non-transitory medium on which computer instructions are stored which when executed by a computer cause the computer to perform the method of any one of Examples 31 to 50.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A processing circuit for a User Equipment (UE), wherein the UE comprises a radio frequency (RF) receiver, wherein the processing circuit is configured to:
set a power switching pattern of the RF receiver for UE power saving in Discontinuous Reception (DRX) Radio Resource Control (RRC) IDLE mode based on a paging occasion (PO) and a synchronization signal block associated with the PO, wherein the power switching pattern comprises a switching off of the RF receiver within a reception time period that is defined for receiving the PO and the synchronization signal block.

2. The processing circuit of claim 1, configured to:
set the power switching pattern based on a time gap between the PO and the synchronization signal block associated with the PO.

3. The processing circuit of claim 2,
wherein the switching off is configured to occur during at least part of the time gap between the PO and the synchronization signal block associated with the PO.

4. The processing circuit of claim 1, configured to:
set the power switching pattern of the RF receiver based on channel condition measurements.

5. The processing circuit of claim 1, configured to:
set the power switching pattern based on a central carrier of the PO and a central carrier of the synchronization signal block associated with the PO.

6. The processing circuit of claim 1, configured to:
set the power switching pattern based on a bandwidth gap between an RF bandwidth of the PO and an RF bandwidth of the synchronization signal block associated with the PO.

7. The processing circuit of claim 6,
wherein the power switching pattern comprises a switching off within at least part of the bandwidth gap between the PO and the synchronization signal block associated with the PO.

8. The processing circuit of claim 1,
wherein the power switching pattern comprises an OFF to ON transition, skipping at least one preceding reference symbols within the synchronization signal block associated with the PO.

9. The processing circuit of claim 8, configured to:
activate preceding Primary Synchronization Signal (PSS) symbol skipping if a received power of a colliding PSS from a neighbor cell is higher than a pre-defined threshold while a timing offset error is lower than a second pre-defined threshold.

10. The processing circuit of claim 9, wherein the OFF to ON transition of the power switching pattern is finished before a Physical Broadcast Channel Demodulation Reference Signal (PBCH DMRS) symbol within the synchronization signal block associated with the PO preserving the PBCH DMRS symbol.

11. The processing circuit of claim 8, configured to:
set the power switching pattern based on a second time gap between the PO and a second synchronization signal block associated with the PO, the second synchronization signal block preceding the synchronization signal block associated with the PO, if a time gap between the PO and the synchronization signal block associated with the PO is shorter than a transition time interval of the RF receiver.

12. The processing circuit of claim 11,
wherein a sum of an OFF to ON transition and an ON to OFF transition of the power switching pattern corresponds to the transition time interval of the RF receiver.

13. The processing circuit of claim 1,
wherein the power switching pattern comprises an ON to OFF transition skipping at least one succeeding reference symbol within the synchronization signal block associated with the PO.

14. The processing circuit of claim 13, configured to:
activate succeeding PBCH DMRS symbol skipping if a received power of a colliding PSS from a neighbor cell is lower than a pre-defined threshold while a timing offset error is higher than a second pre-defined threshold.

15. The processing circuit of claim 13,
wherein the ON to OFF transition of the power switching pattern starts after a Primary Synchronization Signal (PSS) symbol within the synchronization signal block associated with the PO preserving the PSS symbol.

16. The processing circuit of claim 1,
wherein the power switching pattern comprises an OFF to ON transition preceding a first reference symbol within the synchronization signal block associated with the PO and an ON to OFF transition succeeding a last reference symbol within the synchronization signal block associated with the PO.

17. The processing circuit of claim 1, configured to:
set the power switching pattern of the RF receiver for a next DRX cycle based on channel parameter estimations on reference signals received from one or more preceding DRX cycles.

18. The processing circuit of claim 1, configured to:
switch off reception of the synchronization signal block associated with the PO in a subset of DRX cycles; and
switch on reception of the synchronization signal block associated with the PO in the remaining subset of DRX cycles.

19. A method for power switching a radio frequency (RF), receiver of a User Equipment (UE) wherein the method comprises:
setting a power switching pattern of the RF receiver for UE power saving in Discontinuous Reception (DRX) Radio Resource Control (RRC) IDLE mode based on a paging occasion (PO) and a synchronization signal block associated with the PO, wherein the power switching pattern comprises a switching off of the RF receiver within a reception time period that is defined for receiving the PO and the synchronization signal block; and
switching a power mode of the RF receiver based on the power switching pattern.

20. The method of claim 19, comprising:
setting the power switching pattern based on a time gap between the PO and the synchronization signal block associated with the PO.

* * * * *